United States Patent [19]

Heide et al.

[11] Patent Number: 4,575,204
[45] Date of Patent: Mar. 11, 1986

[54] SPECTACLE-LIKE FRAME

[76] Inventors: Otto Heide; Marc O. Heide; Nicole S. Heide; Philipp J. Heide, all of Am Dickelsbach 12, D-4030 Ratingen; Christa Wagner nee Heide, Breslauer Str. 14, D-3560 Biedenkopf, all of Fed. Rep. of Germany

[21] Appl. No.: 514,307

[22] Filed: Jul. 15, 1983

[30] Foreign Application Priority Data

Jul. 28, 1982 [DE] Fed. Rep. of Germany ....... 3228093

[51] Int. Cl.$^4$ .......................... G02C 5/14; G02C 1/00
[52] U.S. Cl. .................................... 351/155; 351/158; 351/112
[58] Field of Search ............... 351/112, 123, 133, 155, 351/158, 59

[56] References Cited

U.S. PATENT DOCUMENTS

| 3,183,523 | 5/1965 | Harrison . |
| 3,758,202 | 9/1973 | Chunga, Sr. . |
| 4,006,974 | 2/1977 | Resnick . |
| 4,316,654 | 2/1982 | Allen .................................. 351/112 |

FOREIGN PATENT DOCUMENTS

| 121778 | 7/1900 | Austria . |
| 23031 | 11/1900 | Austria . |
| 347634 | 1/1922 | Fed. Rep. of Germany . |
| 374412 | 4/1923 | Fed. Rep. of Germany . |
| 1217230 | 12/1958 | France . |
| 1262034 | 4/1960 | France . |
| 1295891 | 7/1961 | France . |
| 323040 | 7/1957 | Switzerland . |
| 13291 | of 1886 | United Kingdom ................ 351/155 |

*Primary Examiner*—Rodney B. Bovernick
*Attorney, Agent, or Firm*—Karl F. Ross; Herbert Dubno

[57] ABSTRACT

A spectacle frame has an eyeglass frame adapted to hold an eyeglass connected to and supported by a clamp having a pair of relatively pivotal members positioned to engage eyebrow hair between them. The clamp can have a pair of stabilizers which can be braced against the head of the user above and below the eyebrow portions gripped in the clamp.

13 Claims, 9 Drawing Figures

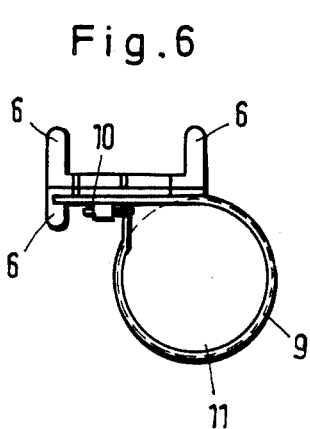
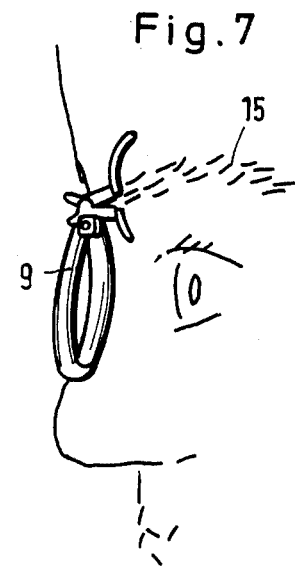
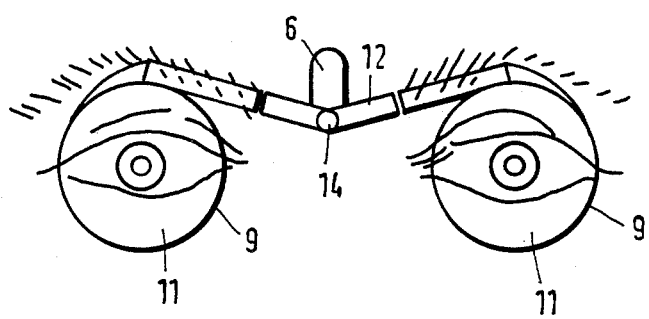
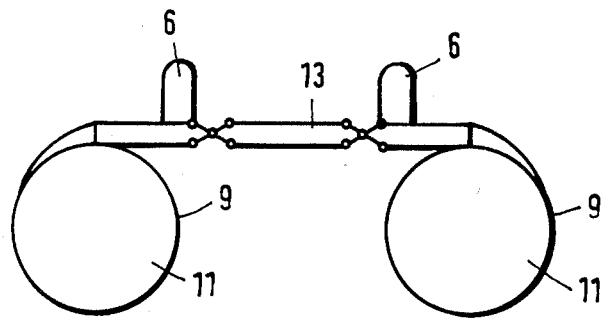

SPECTACLE-LIKE FRAME

FIELD OF THE INVENTION

The invention relates to a spectacle-like frame for receiving at least one eyeglass.

BACKGROUND OF THE INVENTION

Eyeglasses are conventionally held in spactacle frames which are fastened to the person's head on the nose by means of a three-point support and on the ears by means of the ear bows. In addition, there is a spectacle frame without ear bows, which is clamped firmly on the nose.

These known spectacle frames with ear bows cause pressure points on the nose and ears and are heavy if only because of the bows. The spectacle frames without ear bows exert on the nose a pressure which is generated by spring force and which has a disturbing effect with time.

OBJECT OF THE INVENTION

The object of the invention is to provide a spectacle-like frame which, while being of low weight and small dimensions, ensures secure retention on the head and exerts no disturbing pressure on the nose or other points on the head.

SUMMARY OF THE INVENTION

This object is achieved, according to the invention, due to the fact that the spectacle-like frame has a clamp, especially a clip, which can be fastened to the eyebrow and which holds, directly or indirectly, the mounting for receiving the eyeglass.

Thus, in contrast to the state of the art, in the present invention the frame holding the eyeglass is fastened to the eyebrow.

The frame is not necessary to support the frame on the nose. Essential features of the fastening on the eyebrow are the clamp or clip which is clamped firmly in the hair of the eyebrow. There can also be supporting elements which prevent the clamp from tilting or tipping off by supporting it against the skull. The clamping effect is safeguarded by dividing the clamp into several clamping regions.

The actual eyeglass mounting is fastened to the clamp. It is suspended freely in space, for example, underneath the clamp. The appliance can be worn singly or as two single frames independent of one another. A connection between two single frames, for example via a bridge, to form a spectacle-like frame receiving two eyeglasses is possible.

According to a feature of the invention the frame is supported against the head by arms in the clamp or in other parts, especially resilient bows. The bows or arms which which project from the clamp are bent or angled in the direction of the persons' head and can be located above and/or below the clamp.

The bows or arms can be located outside the actual clamping region between the mountings or clamps, especially on a connecting bridge and the clamp can have two or more clamping elements arranged one above another.

The clamp can also be subdivided into several clamping regions which are arranged horizontally next to one another and which can be clamped firmly to the hair of the eyebrow independently on one another. The clamp may follow the cover of the eyebrow in its axial direction and inner clamping faces can have a toothing and/or a soft gripping layer.

According to yet another feature of the invention the clamp and the eyeglass mountings can form an angle with one another.

The element generating the clamping force is a spring or magnet and the invention can comprise two monocular constructions not connected to one another or provided with devices which enable them to be connected to form a binocular structure, preferably with a joint for angular adjustment. The clamps, connecting central pieces and/or other parts of the frame carry exchangeable covers especially decorative covers.

BRIEF DESCRIPTION OF THE DRAWING

Exemplary embodiments of the invention are illustrated in the drawing and are described in more detail below. In the drawing:

FIG. 6 shows a view of the side of a clamp facing the head, with a mounting fastened thereon, on a smaller scale:

FIG. 7 shows a clamp fastened to the head;

FIG. 8 shows a view of the side of a binocular construction facing away from the head, with a rotationally adjustable connecting linkage; and FIG. 9 shows a view according to FIG. 8 of a binocular construction with a connecting linkage as an opening mechanism for the clamps.

SPECIFIC DESCRIPTION

Figure 1:
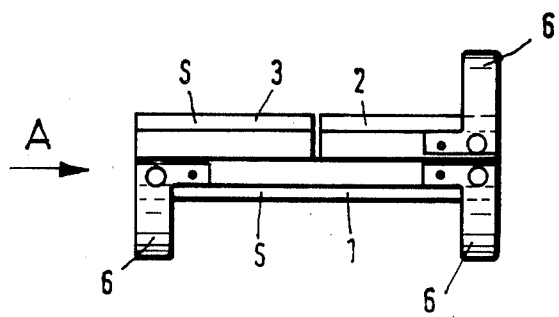
FIG. 1 shows a view of the side of a clamp facing the head, in a closed state.
Figure 2:
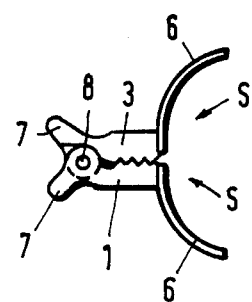
FIG. 2 shows a view in the direction of the arrow A of FIG. 1.
Figure 3:
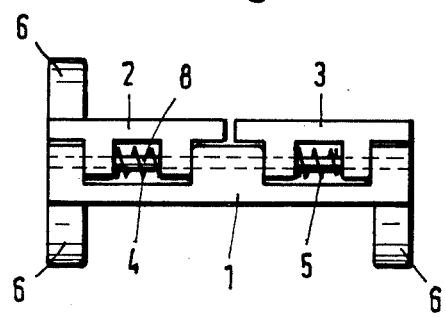
FIG. 3 shows a view of the side of the clamp according to FIG. 1 which faces away from the head.
Figure 4:
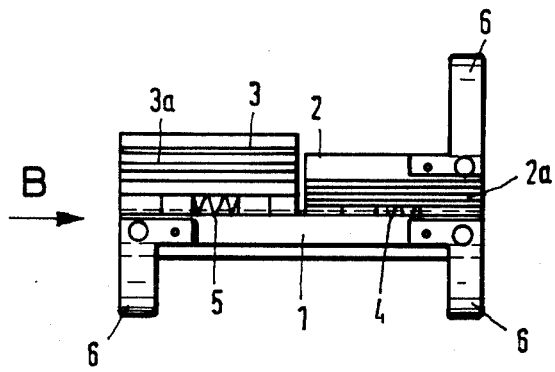
FIG. 4 shows a view according to FIG. 1 in the opened state.
Figure 5:
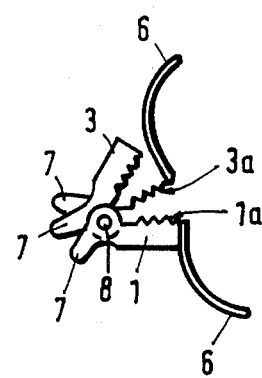
FIG. 5 shows a view in the direction of the arrow B in FIG. 4.

In the embodiment according to FIGS. 1 to 7, the device consists of a clamp or clip which is composed of the basic body 1 and two articulated joint bodies 2 and 3. The basic body and the joint bodies can be designated as clamping elements and have a similar or identical design as to their cross-section, being symmetrical to one another in cross-section as to pivoting.

The inner clamping faces 2a,3a of the joint bodies are pressed by means of joint springs 4 and 5 onto the clamping face 1a of the basic body. The springs 4,5 rest as helical torsion springs on the clamp pivot pin 8 extending horizontally through them. The joint bodies 2,3 are individually movable in relation to the basic body 1. Arms, supporting elements or supporting bows 6 are fastened at right angles to the pivot pin 8, above and below the clamp, on the end face S of the basic body and of the joint body which is turned towards the head.

The basic body and joint bodies each have on the side facing away from the head handle ends 7 which allow the clamp to be spread open. Since the handle ends 7 extend beyond the pivot pin 8 on the side facing away from the head, they form, together with the joint body 2,3 and the basic body 1 respectively, a portion of a two-armed lever. Furthermore, the clamping faces 1a,-2a,3a are each equipped with toothing and/or a soft rest, the purpose of which is to grip the eyebrow hair more effectively.

To clamp it firmly to the eyebrow, the clamp is opened via its handle ends 7 by means of finger pressure and pushed over the eyebrow hair. The clamp is clamped firmly in the hair in the toothing region and is safeguarded against tipping by means of the supporting bows 6 which rest against the head.

The clamp can be clamped in the eyebrows several times, here twice. Thus, hair regions of different thicknesses can be gripped separately for clamping purposes via the joint bodies 2 and 3.

Underneath the clamp (FIG. 6), the eye-glass mounting 9 is fastened to the basic body 1. It holds the eyeglass 11 firmly via a screw mechanism 10. The mounting 9 can be adjustable in its position relative to the clamp, especially displaceable, rotatable or tiltable.

FIG. 7 shows the device fastened to a person's head. The frame can be fastened individually on each eyebrow and does not need to be in contact with the second frame resting on the next eyebrow. However, according to the construction in FIG. 8, it is possible to combine the single eyeglass holder into a double eye-glass holder via a connecting linkage 12. In a further exemplary embodiment according to FIG. 9, an opening mechanism (linkage) 13, which actuates at least two clamps, is attached centrally between the individual clamps, so that the two clamps can simultaneously be opened centrally by means of one handle.

The clamping elements, that is to say the basic body 1 and the joint bodies 2,3, are rounded off on their end faces S towards the clamping faces 1a,2a,3a, so that a widening which increases outwards arises there and consequently the clamping faces start only at a distance A from the end faces and from the head. This prevents facial skin from being pinched inadvertently.

According to FIG. 8, the connecting bridge 12 can have a joint 14 in the center for the angular adjustment of the frame parts relative to one another. Furthermore, the clamp and mounting can form an acute, especially variable angle with one another. For this purpose, the mounting can be connected to the clamp via a flexible bridge (not shown).

In further exemplary embodiments not illustrated in the drawing, a magnet can be used instead of the torsion spring, and the clamps, the parts located between them, especially the bridges and linkages, and other parts of the frame as well as the mounting can carry covers for decoration.

As illustrated in FIGS. 8 and 9, the supporting bows 6 do not necessarily have to be fastened to the clamps, but can also be fastened to other parts of the frame, especially to the connecting bridge, linkage or mounting. There is likewise a free choice of supporting points on the face and skull, also to comply with design requirements.

We claim:

1. A spectacle frame which comprises:
   a holder for receiving at least one eyeglass lens;
   a clamp connected to and supporting said holder, said clamp having a pair of relatively displaceable parts formed with surfaces biased toward one another and positioned above said lens to engage and grip the hair of an eyebrow of a wearer; and
   means connected to said lens and said clamp for bracing the frame against the head of a wearer at a location spaced from that at which the hair is gripped by said clamp.

2. The spectacle frame defined in claim 1 wherein said means connected to said lens and said clamp includes at least one bow on said clamp for bracing said frame on the head of said wearer.

3. The spectacle frame defined in claim 2 wherein said bow extends upwardly above said clamp.

4. The spectacle frame defined in claim 2 wherein said bow extends downwardly from said clamp.

5. The spectacle frame defined in claim 2 which includes a bridge connecting two lens-carrying portions, said bow being provided on said bridge.

6. The spectacle bridge defined in claim 1 wherein said clamp is divided into two adjacent portions, each portion independently engaging a different part of the eyebrow from the other portion.

7. The spectacle frame defined in claim 1 wherein said clamp follows the curve of the eyebrow in its axial direction.

8. The spectacle frame defined in claim 1 wherein said surfaces are provided with means adapted to retain the hairs of said eyebrow to them.

9. The spectacle frame defined in claim 1 wherein said displaceable parts are biased by a spring to urge said surfaces toward one another.

10. The spectacle frame defined in claim 8 wherein said means adapted to retain the hairs of said eyebrow to said surfaces includes toothing on at least one of said surfaces.

11. The spectacle frame defined in claim 1 wherein said holder forms a monocle.

12. The spectacle frame defined in claim 1 wherein said holder includes two frame parts each receiving a respective lens and bridge means for joining said frame parts together while enabling angular relative adjustment therebetween.

13. The spectacle frame defined in claim 1 wherein said holder is provided with means for retaining a pair of eyeglass lenses thereon, and one said clamp being provided above each of said lenses.

* * * * *